(12) United States Patent
Kasten

(10) Patent No.: US 9,562,511 B2
(45) Date of Patent: Feb. 7, 2017

(54) SYSTEM AND METHOD FOR LOW ECOLOGY IMPACT GENERATION OF HYDROELECTRIC POWER

(71) Applicant: Gene D. Kasten, Bend, OR (US)

(72) Inventor: Gene D. Kasten, Bend, OR (US)

( * ) Notice: Subject to any disclaimer, the term of this patent is extended or adjusted under 35 U.S.C. 154(b) by 14 days.

(21) Appl. No.: 14/603,000

(22) Filed: Jan. 22, 2015

(65) Prior Publication Data

US 2015/0204300 A1   Jul. 23, 2015

Related U.S. Application Data

(60) Provisional application No. 61/944,424, filed on Feb. 25, 2014, provisional application No. 61/930,276, filed on Jan. 22, 2014.

(51) Int. Cl.

| | |
|---|---|
| *F01D 15/10* | (2006.01) |
| *F02C 6/00* | (2006.01) |
| *H02K 7/18* | (2006.01) |
| *H02P 9/04* | (2006.01) |
| *F03B 7/00* | (2006.01) |
| *F03B 13/06* | (2006.01) |
| *F03B 17/00* | (2006.01) |
| *F03B 17/06* | (2006.01) |

(52) U.S. Cl.
CPC .............. *F03B 7/003* (2013.01); *F03B 13/06* (2013.01); *F03B 17/00* (2013.01); *Y02E 10/20* (2013.01); *Y02E 10/22* (2013.01); *Y02E 10/223* (2013.01); *Y02E 60/17* (2013.01)

(58) Field of Classification Search
USPC .............................................. 290/52; 60/640
See application file for complete search history.

(56) References Cited

U.S. PATENT DOCUMENTS

| | | |
|---|---|---|
| 601,906 A | 4/1898 | Rudasill |
| 980,666 A | 1/1911 | Overfield |
| 988,426 A | 4/1911 | Anderson |
| 1,260,204 A | 3/1918 | Keithly |
| 1,459,645 A | 6/1923 | Wilson |
| 1,813,107 A | 7/1931 | Allner |
| 2,499,715 A * | 3/1950 | Blevins ................... F03B 17/02 60/640 |
| 2,583,528 A * | 1/1952 | Habsch ................... F03B 17/02 417/329 |
| 2,962,599 A | 11/1960 | Pirkey |
| 3,984,698 A | 10/1976 | Brewer |

(Continued)

*Primary Examiner* — Pedro J Cuevas
(74) *Attorney, Agent, or Firm* — St Onge Steward Johnston and Reens LLC

(57) ABSTRACT

A hydro-electric power system includes two containers and a support beam having two ends, each end holding one of the containers. The ends allow the containers to travel along a length of the support beam. The support beam pivots about a pivot point, giving each container a maximum height and a minimum height. Water flows into each of the containers when they are located at or near their maximum height, the flow of water weighting each container and causing it to descend, each container moving longitudinally outward from the pivot point along the support beam as it descends. A tipping mechanism causes each container to release water at or near its minimum height, each container ascending after releasing water and moving longitudinally inward toward the pivot point along the support beam as it ascends.

18 Claims, 8 Drawing Sheets

(56) References Cited

U.S. PATENT DOCUMENTS

| | | | |
|---|---|---|---|
| 4,246,756 A * | 1/1981 | West | F03B 17/02 60/640 |
| 4,260,902 A | 4/1981 | Crider | |
| 4,385,497 A | 5/1983 | Scott | |
| 5,970,713 A * | 10/1999 | Iorio | F03G 3/00 60/640 |
| 6,210,113 B1 | 4/2001 | Ihrenberger | |
| 6,237,342 B1 * | 5/2001 | Hurford | F03G 3/00 60/721 |
| 6,956,300 B2 * | 10/2005 | Gizara | F03B 17/061 290/42 |
| 7,768,144 B2 * | 8/2010 | North | F03B 13/1805 290/42 |
| 8,164,213 B2 * | 4/2012 | Mahaffy | F03D 3/005 290/44 |
| 8,231,327 B2 | 7/2012 | Davis, Sr. | |
| 8,297,055 B2 | 10/2012 | Ackman | |
| 9,212,650 B2 * | 12/2015 | Blatchley, Sr. | F03B 17/00 |
| 2011/0095536 A1 * | 4/2011 | Bridwell | F03D 5/00 290/54 |
| 2011/0173976 A1 | 7/2011 | Meadon et al. | |
| 2013/0270835 A1 * | 10/2013 | Pingitore | F03B 17/005 290/1 A |
| 2015/0211480 A1 * | 7/2015 | Pingitore | F03B 17/005 290/1 A |

\* cited by examiner

SYSTEM AND METHOD FOR LOW ECOLOGY IMPACT GENERATION OF HYDROELECTRIC POWER

FIELD OF THE INVENTION

The present teachings relate generally to power systems and, more particularly, to hydroelectric power systems having enhanced torque capabilities.

BACKGROUND OF THE INVENTION

Dwindling non-renewable energy sources, along with the negative environment impact associated with consuming non-renewable energy sources, has greatly increased the demand for renewable energy. One form of renewable energy is hydroelectric power, in which the flow of water is utilized to generate electrical energy. The advantages of hydroelectric power is that the energy source is sustainable (e.g., as rain falls it replenishes a river where the equipment is located) and the flow of water is relatively "clean" (e.g., there is very little generation of unwanted byproducts such as is created by the burning of fossil fuels).

A water wheel is one form of hydroelectric machine that converts the energy of free-flowing or falling water into rotational energy. A water wheel consists of a large wheel with a number of blades or containers arranged on an outside rim forming a driving surface. Water is typically diverted from a water source (e.g., a river) or storage basin along a channel or pipe and the downward force exerted on the blades or containers drives the wheel, which in turn rotates an axle that may drive other machinery. Water leaving the wheel may be drained through a channel but may also be directed into yet another wheel, turbine or mill. The passage of water may be controlled by sluice gates that allow maintenance and some measure of flood control.

Water wheels have traditionally been used with watermills, where the water wheel drives a mechanical process such as flour, lumber or textile production, or metal shaping (rolling, grinding or wire drawing). However, modern hydroelectric dams can be viewed as the descendants of the water wheel as they too take advantage of downward water flow.

A major drawback of known hydroelectric power systems is the environmental impact the structures have on the environment. For example, typically dams are erected on a running water source, such as a river, and are used to generate a steady supply of electricity. However, it is well known that placing barriers in a river negatively impacts the animal life naturally occurring in the river, even preventing some species from migrating to spawning grounds. These barriers can have unanticipated negative effects on still other animal species that are affected by the decline of the species blocked or hindered by the hydroelectric equipment.

In an attempt to mitigate the negative effects such equipment causes, bypasses have been provided in, for instance, dams to allow various species to move up and down a river past the hydro-electric equipment. However, such bypasses have only been marginally effective as the vast majority of the water way still remains blocked.

Known systems also suffer from other deficiencies, including a lack of efficiency and the inability to scale down their size for smaller uses.

Therefore, it would be beneficial to have a superior system and method for low environmental impact generation of hydroelectric power.

SUMMARY OF THE INVENTION

The needs set forth herein as well as further and other needs and advantages are addressed by the present embodiments, which illustrate solutions and advantages described below.

The system may in one embodiment include, but is not limited to, two containers and a support beam having two ends, each end adapted to hold one of the containers. The ends are each adapted to allow the containers to travel along a length of the support beam. The support beam pivots about a pivot point, giving each of the containers a maximum height and a minimum height. A water source delivers a flow of water into each of the containers when they are located at or near their maximum height, the flow of water at least partially fills each container and causes it to descend, each container moving longitudinally outward (e.g., longitudinally relative to the longitudinal axis of the support beam) from the pivot point along the support beam as it descends. A tipping mechanism causes each container to release water at or near its minimum height. Each container ascends after releasing water and moves longitudinally inward toward the pivot point along the support beam as it ascends.

In another embodiment, the system includes, but is not limited to, a wheel and at least two pairs of containers, each pair having its containers on opposite sides of the wheel. Two intersecting support beams each have two ends, each end having a rounded support holding one of a pair of containers, the ends each adapted to allow the containers to travel along a length of the support beam. The two support beams rotate about a pivot point, giving each of the containers a maximum height and a minimum height. A water source delivers a flow of water into each of the containers when they are located at or near their maximum height, the flow of water at least partially fills each container and causes it to descend, each container moving longitudinally outward from the pivot point along the support beam where it is held as it descends. A tipping rod causes the container to release water at or near its minimum height, after releasing water the tipping rod interacts with a lever in order to release the tipping rod and allow the container to move to an upright position. Each container ascends after releasing water and moves longitudinally inward toward the pivot point along the support beam where it is held as it ascends.

In a further embodiment, the system includes, but is not limited to, two containers held in a teeter totter arrangement by a support beam. The support beam has two ends, each end holding one of the containers and adapted to allow the containers to travel along a curved path. The support beam pivots about a pivot point, giving each of the containers a maximum height and a minimum height. A water source delivers a flow of water into each of the containers when they are located at or near their maximum height, the flow of water at least partially fills each container and causes it to descend, each container moving longitudinally outward from the pivot point along the support beam as it descends. A tipping mechanism tips each container to release water at or near its minimum height, each container ascending after releasing water and moving longitudinally inward toward the pivot point along the support beam as it ascends. In effect, this embodiment functions similar to a teeter-totter, but with the containers alternatingly moving inward and outward relative to the axis point as described above. While the tipping mechanisms may be attached to the containers, it is understood that the tipping mechanisms may not be mounted on the containers but rather on a frame of the device or on a location near where the containers are to be tipped, although not limited thereto.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

Figure 1:
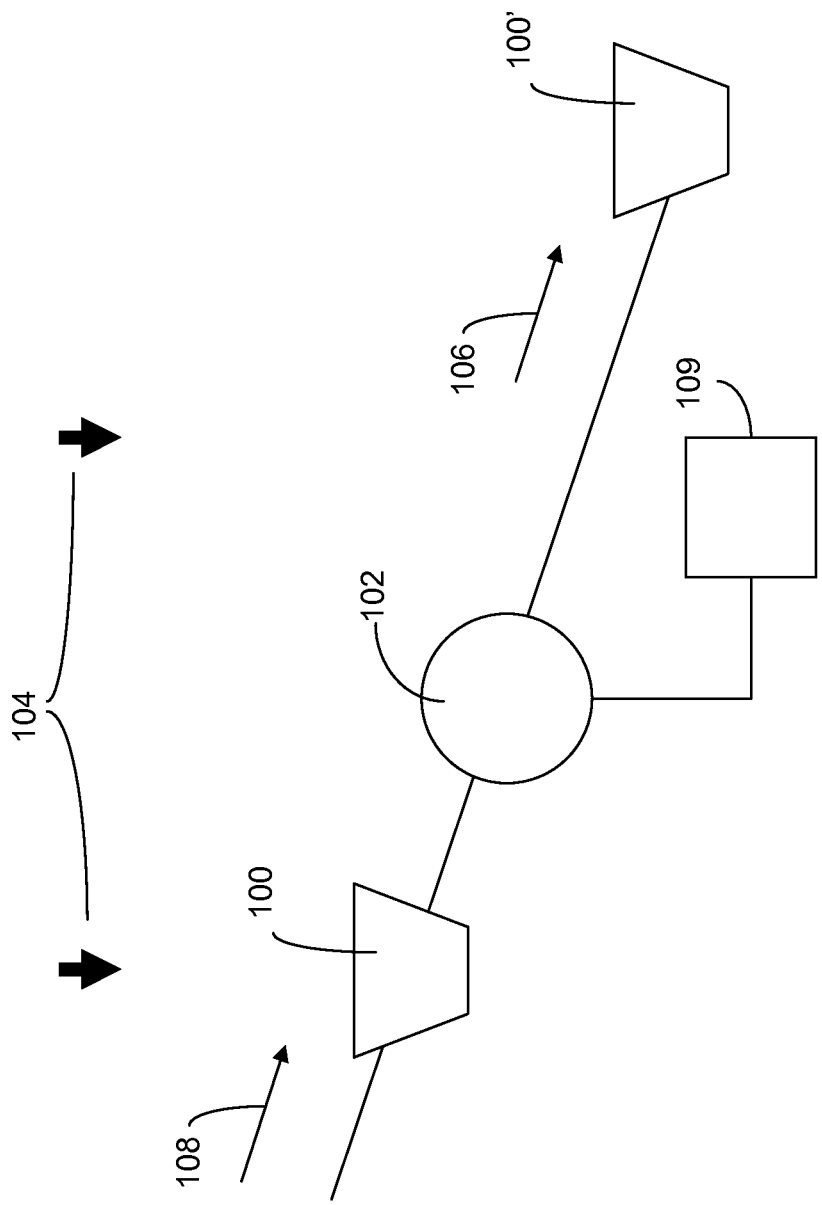
FIG. 1 is a diagram of one embodiment of the enhanced torque capabilities according to the present teachings.

The present teachings are described more fully hereinafter with reference to the accompanying drawings, in which the present embodiments are shown. The following description is presented for illustrative purposes only and the present teachings should not be limited to these embodiments. For purposes of explanation and not limitation, specific details are set forth such as particular techniques, etc., in order to provide a thorough understanding. In other instances, detailed descriptions of well-known methods are omitted so as not to obscure the description with unnecessary detail.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

The present teachings may utilize a water pick-up device. Rather than having a dam constructed in a river that obstructs the flow thereof, a tube may be placed at the bottom of the river as a water pick-up device. The tube may be placed on the river bottom for a length of river having an elevation change (e.g., 20-50 feet or more). The elevation drop of the river may determine the length of the tube necessary to reach the desired height of the opening of the tube. For example, on a river bed having a steep elevation it may not be necessary to have as long as a tube. What is desired is to have a water pick-up device capable of delivering adequate water flow to actuate a system according to the present teachings. One of skill in the art will understand that relevant authorities may require the use of a screen to prevent wildlife from entering the tube and this may be used to prevent debris from entering and clogging the system.

Accordingly, the opening(s) of the tube may be positioned at an elevation that is higher than the highest point of a pivoting or rotating structure such that gravity will allow the flow of water entering the tube to run downhill through the tube and be directed into the various containers to actuate the structure, in one embodiment, containers may be filled at an angular point that is at or just below the highest elevation point of the structure. It will be understood that water may be discharged in the direction of rotation, which will add to the rotational torque of the system.

The system according to the present teachings may be used to convert gravitational forces (e.g., a flow of water) to electrical energy. In particular, the present teachings allow for the generation of hydro-electric power that reduces impact on the ecology of the environment into which it is placed. It does so with improved efficiency that increases the downward torque force on a pivoting or rotating structure. As would be appreciated by one skilled in the art, this improved torque force can be converted to electrical power by the use of a turbine generator or other power generator.

Torque is the tendency of a force to rotate an object about an axis. In other words, torque is a measure of the turning force on an object. For example, pushing or pulling the handle of a wrench connected to a nut or bolt produces a torque (turning force) that loosens or tightens the nut or bolt. The magnitude of torque depends on three quantities: the force applied, the length of the lever arm connecting the axis to the point of force application, and the angle between the force vector and the lever arm. This is shown in symbols as follows:

$$\tau = r \times F$$

$$\tau = \|r\| \|F\| \sin \theta$$

Where $\vec{\tau}$ is the torque vector and $\tau$ is the magnitude of the torque, r is the displacement vector (a vector from the point from which torque is measured to the point where force is applied), F is the force vector, × denotes the cross product, θ is the angle between the force vector and the lever arm vector. The length of the lever arm is particularly important and is often critical to the operation of levers, pulleys, gears, and most other machines involving a mechanical advantage.

Referring now to FIG. 1, shown is a diagram of one embodiment of the enhanced torque capabilities according to the present teachings. A plurality of containers 100,100' (also referred to as buckets, tubs, etc.) pivot and/or rotate around a pivot point 102 (e.g., axis point, hub, etc.). The containers 100,100' catch water released from a water source 104 (e.g., water pick-up device, storage tank, etc.) in an alternating manner such that as one catches water it will become heavier and descend until it reaches its lowest point and discharges its water. As one descends, another will rise (e.g., on opposite side of pivot point 102) after having discharged its water.

In one embodiment, the containers 100,100' may be provided such that they are least partially overlapping so that as water falls from the water source 104 water is not lost. For example, any water that splashes and misses a container at or near its maximum height can be caught by another container that is below it (e.g., by overlapping).

In order to increase the efficiency of the system, a mechanical structure (various embodiments discussed further below) allows a container 100' to move 106 outward from the pivot point 102 as it descends. This increases its torque (e.g., downward force) by increasing the length of its pivot (or rotational) arm. Similarly, as container 100 ascends after discharging its water the mechanical structure allows it to move 108 inward toward the pivot point 102. This decreases its torque (e.g., downward force) by decreasing the length of its pivot (or rotational) arm and allows for a lower water delivery height. As a result, the system allows for improved torque efficiency by changing the length of the pivot (or rotational) arm.

As would be appreciated by one skilled in the art, an electric generator 109 may be coupled to the pivot point 102 to convert the mechanical energy from the system's actuation to electricity.

Figure 2:
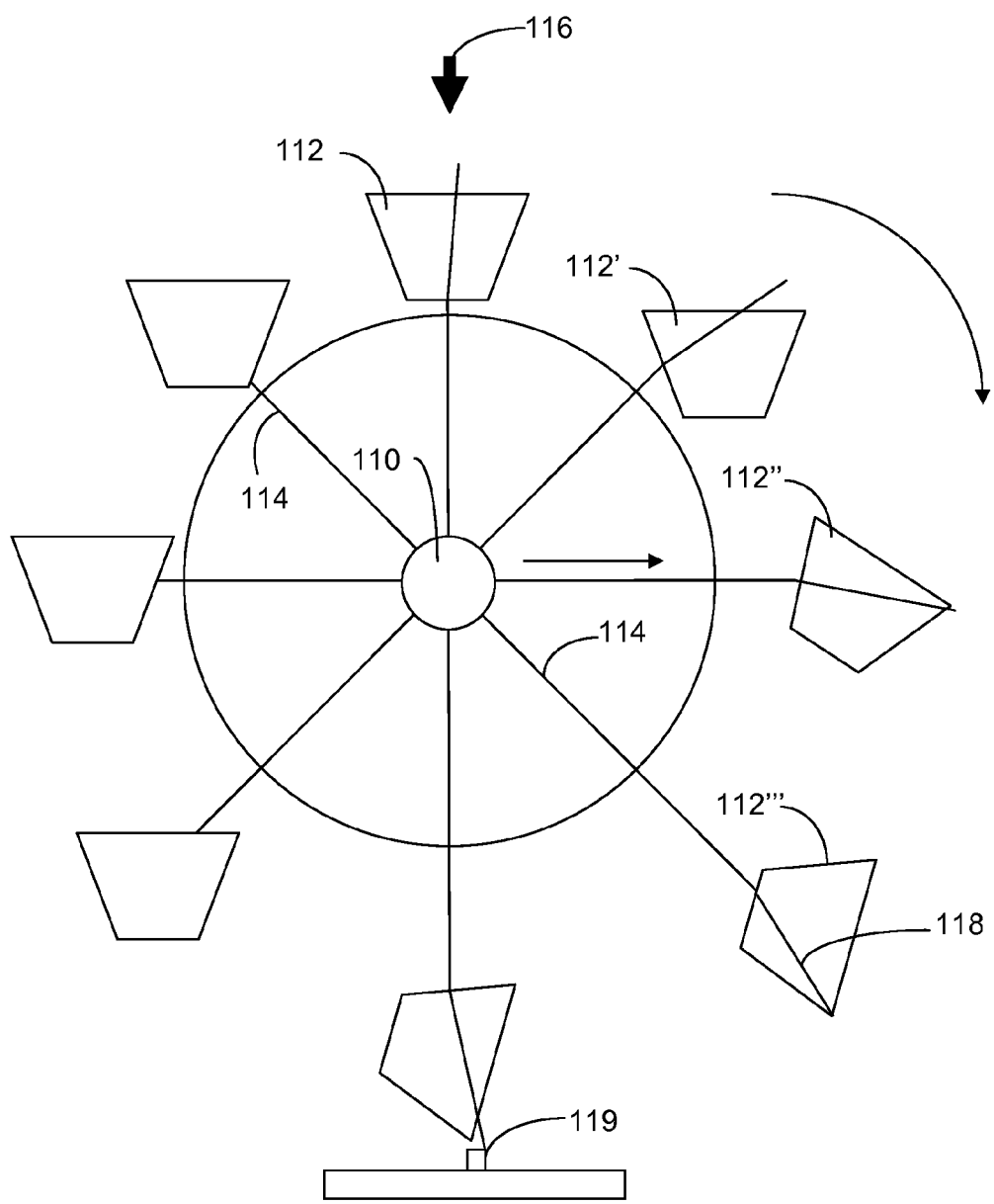
FIG. 2 is a diagram of a water wheel according to the enhanced torque capabilities of FIG. 1.

Referring now to FIG. 2, shown is a diagram of a water wheel according to the enhanced torque capabilities of FIG. 1. As shown in this embodiment, a water wheel has a pivot point 110 (e.g., central axis, hub, rotation point, etc.) about which the wheel rotates. The wheel is provided with containers 112 (e.g., tubs or containers) fixed about a circumference of the wheel at selected intervals. Support beams 114 extend outward from the pivot point 110 of the wheel to the containers 112, which may be attached in pairs such that a support beam 114 extending outward from the axis 110 will have a counterpart support beam 114' extending substantially parallel at 180 degrees therefrom. It is to be appreciated that each pair of support beams 114, 114' may be connected to each other and comprise a single beam.

Each support beam 114, 114' may be provided with rollers (e.g., roller bearings) and a track arraignment (discussed further below) that allows a container 112 to move radially relative to the pivot point 110 to improve torque efficiency.

In operation, water is poured from a water source 116 (e.g., using water pickup device discussed above, storage container, etc.) into a container 112 at or near its maximum height of rotation. The weight of the water moves the container 112", 112''' radially outward from the pivot point 110 as it descends. This increase in the distance of a container to the pivot point 110 increases the torque of the weighted container, improving the efficiency of rotation.

At the same time, a container on the opposite side of the pivot point 110 may move in an opposite direction (e.g., toward the pivot point 110). In particular, as the container 112''' rotates about the pivot point 110, it will eventually reach an angular rotation point that is its minimum height (e.g., lowest elevation of the circumference of the wheel). At or near this point a tipping mechanism 118 (e.g. a tip rod, or the like, discussed further below) causes the water to be poured from the container (e.g., back into the river, storage container, etc.).

In one embodiment, the tipping mechanism 118 is a tip rod that keeps the orientation of the container 112''' (e.g., rotation relative to support beam where it is held) fixed in relation to the wheel such that at the bottom of its rotation water will be poured out. At the bottom of the rotation of the wheel, a member 119 (e.g., lever fixed on the ground, etc.) may interact with the tip rod 118 in order to release it and allow the container 112''' to rotate to a horizontal position. In one embodiment the tipping mechanism may be a spring-loaded mechanism (or the like) that engages to tip the bucket when it is at or near its minimum height (e.g., at greater than 150 degrees relative to the orientation of the wheel).

The empty container may then move inward toward its pivot point 110 as it ascends. This decreases the torque resulting from the empty container, again improving the efficiency of rotation. A resilient member (discussed below) may be attached to the container such that upon the release of the water, a force pulls the container and associated equipment into a relatively close axial position relative to the pivot point 110. It should be understood that when a spring is used as the resilient member it may not provide enough force to overcome the weight of the water when the container is full. This allows the container (and equipment) to extend outward to a maximum distance from the pivot point 110 as described above.

In another embodiment, the resilient member may comprise a connecting beam that allows two containers on opposite sides of the pivot point 110 to move in unison. While the use of a spring to pull the bucket inward after the bucket is emptied may be desirable, one of skill in the art will understand that the use of springs is not absolutely required. As the weight of the water in one container causes the beam holding it to move out from the pivot point 110, the counterpart container may move in the opposite direction (e.g., toward the pivot point 110).

The result is a hydroelectric generation system that provides improved torque efficiency that may be used to turn a system of gears attached to an alternator in order to generate electrical energy, although not limited thereto. The system advantageously does not require the construction of dam, but rather may only utilize a pipe or tube located along the bottom of the river for minimal ecological impact. Likewise, the elevation change required from the input of the tube to the pouring location for the containers does not have to be substantial due to the sliding mechanism of the containers, which maximizes torque. Accordingly, it provides relatively "clean" and efficient electrical power that has a minimal impact on the ecology of the environment in which the equipment is located.

Figure 3A:
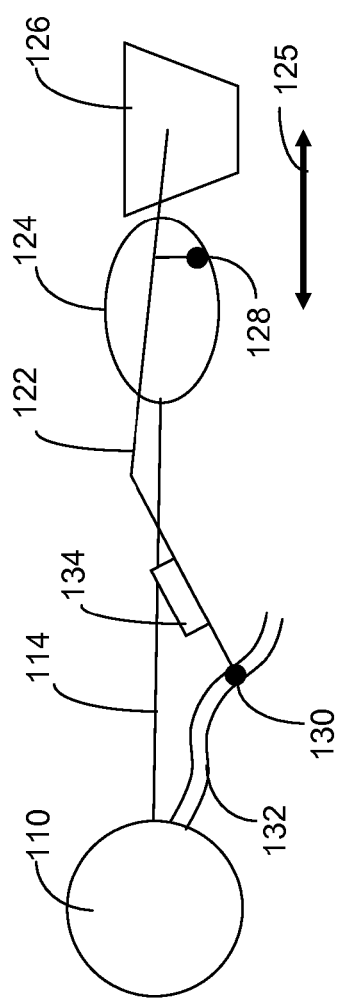
FIGS. 3A-3C are more detailed diagrams of a support beam of FIG. 2.
Figure 3B:
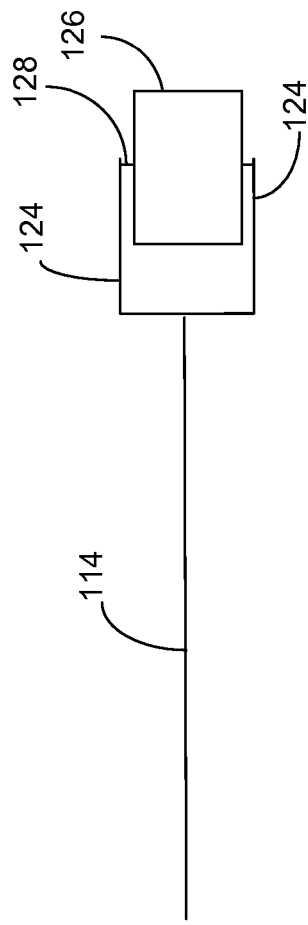
Figure 3C:
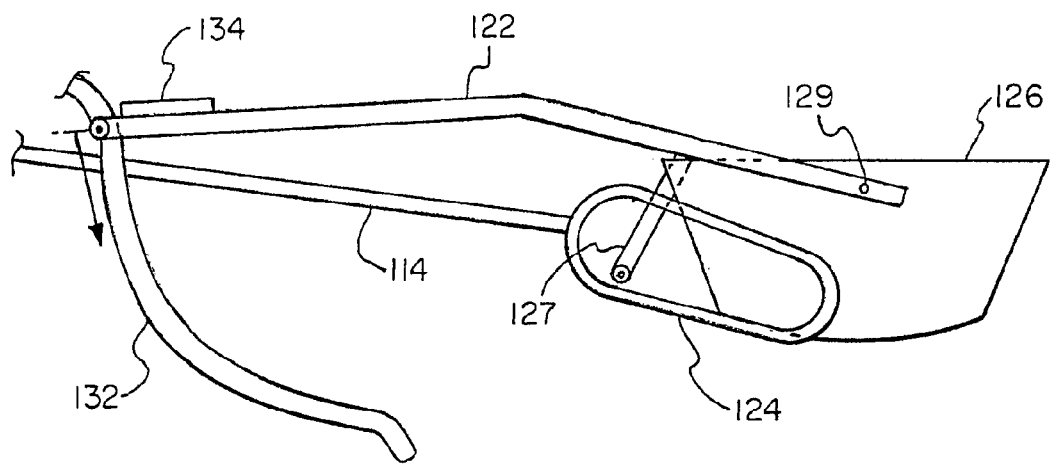

Referring now to FIGS. 3A-3C, shown are more detailed diagrams of a support beam 114 of FIG. 2. The support beam 114 may be attached to the pivot point 110 and may support a pair of rounded supports 124. In one embodiment, the rounded supports 124 are substantially in the shape of an oval. These may be held by the support beam 114 in the form of a wishbone (top view shown in FIG. 3B).

The rounded supports 124 allow a container 126 to move 125 radially from the axis 110. The container 126 may have rollers 128 (e.g., wheels or some other mechanism for facilitating travel) disposed in the rounded supports 124 that allow the container 126 to move 125 radially from the axis 110 through the length of the rounded supports 124 (e.g., wishbone ends).

The container 126 may be connected to a moving beam 122 (e.g., may be 1"×2" aluminum tubing, etc.). The moving beam 122 may be angled at the end opposite of the container 126 and have another roller 130 (e.g., wheels or some other mechanism for facilitating travel) that is disposed in a track 132. In one embodiment, the track 132 may be in the shape of an elongated "s" (e.g., s-shaped). Such a shape facilitates maximization of torque forces by keeping the container 126 in preferred positions during rotation. For example, on the downward rotation of the wheel (when the container 126 has water), the s-shape facilitates radial travel of the container 126 away from the pivot point 110 as the roller 130 descends the curve in the track 132, thus increasing downward torque forces. On the upward rotation of the wheel (when the container 126 is empty), the s-shape facilitates radial travel of the container 126 toward the pivot point 110, thus decreasing torque forces. In short, the s-shape helps pull the container 126 in toward the pivot point 110 when going up and helps push the container 126 out from the pivot point 110 when going down.

The moving beam 122 may also have a weighted portion 134 (e.g., 10, 20, 50, 100 lbs, etc.) disposed thereon. The weight may help the moving beam 122 travel in a preferred way along the s-shaped track 132. Travel in the s-shaped track 132 may also serve to reverse rotation of a container relative to the support beam where it is held, adding to downward torque.

As shown in FIG. 3C, because of the angle and location of the leg 127 relative to the rounded supports 124 and the location of the container mount points 129, the container 126 may reverse some of its downward motion as the moving beam 122 travels down the track 132. The Leg may 127 become vertical (or substantially vertical), adding to lift. This results in more downward torque. This torque increase may magnify as the size of the wheel and related components increases.

Figure 4:
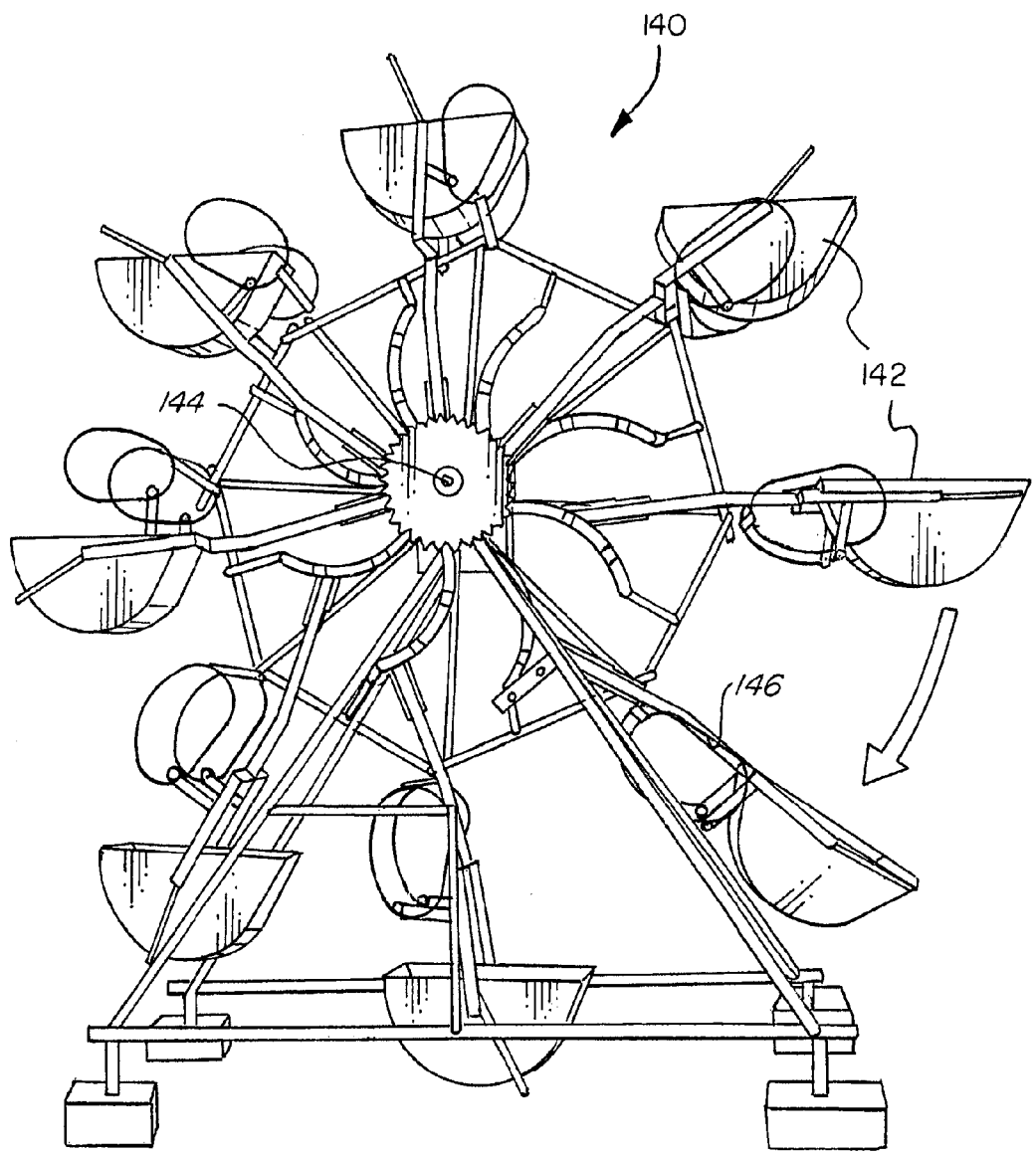
FIG. 4 is a more detailed diagram of a water wheel according to FIG. 2.

Referring now to FIG. 4, shown is a more detailed diagram of a water wheel 140 according to FIG. 2. As shown, containers 142 may rotate about a pivot point 144 and travel in rounded supports 146 along the length of wishbone ends.

The wheel 140 may be constructed in various dimensions. In one embodiment, the diameter of a wheel may be 30 feet or more, although not limited thereto. The system is scalable to any number of dimensions, including smaller wheels with a diameter approximately 5 feet, 10 feet, 15 feet, and 20 feet, etc., which may depend on the elevation of the intake.

A system according to the present teachings may provide for efficient torque with little water use. For example, 1 gallon of water on a 90 degree arm may produce 55 ft/lb torque. 1 gallon of water on a 90 degree arm and 1 gallon of water on an arm above may product 100 ft/lb torque. 1 gallon of water on a 90 degree arm, 1 gallon of water on an arm above, and 1 gallon of water on an arm below may produce 140 ft/lb torque, although not limited thereto.

Figure 5A:
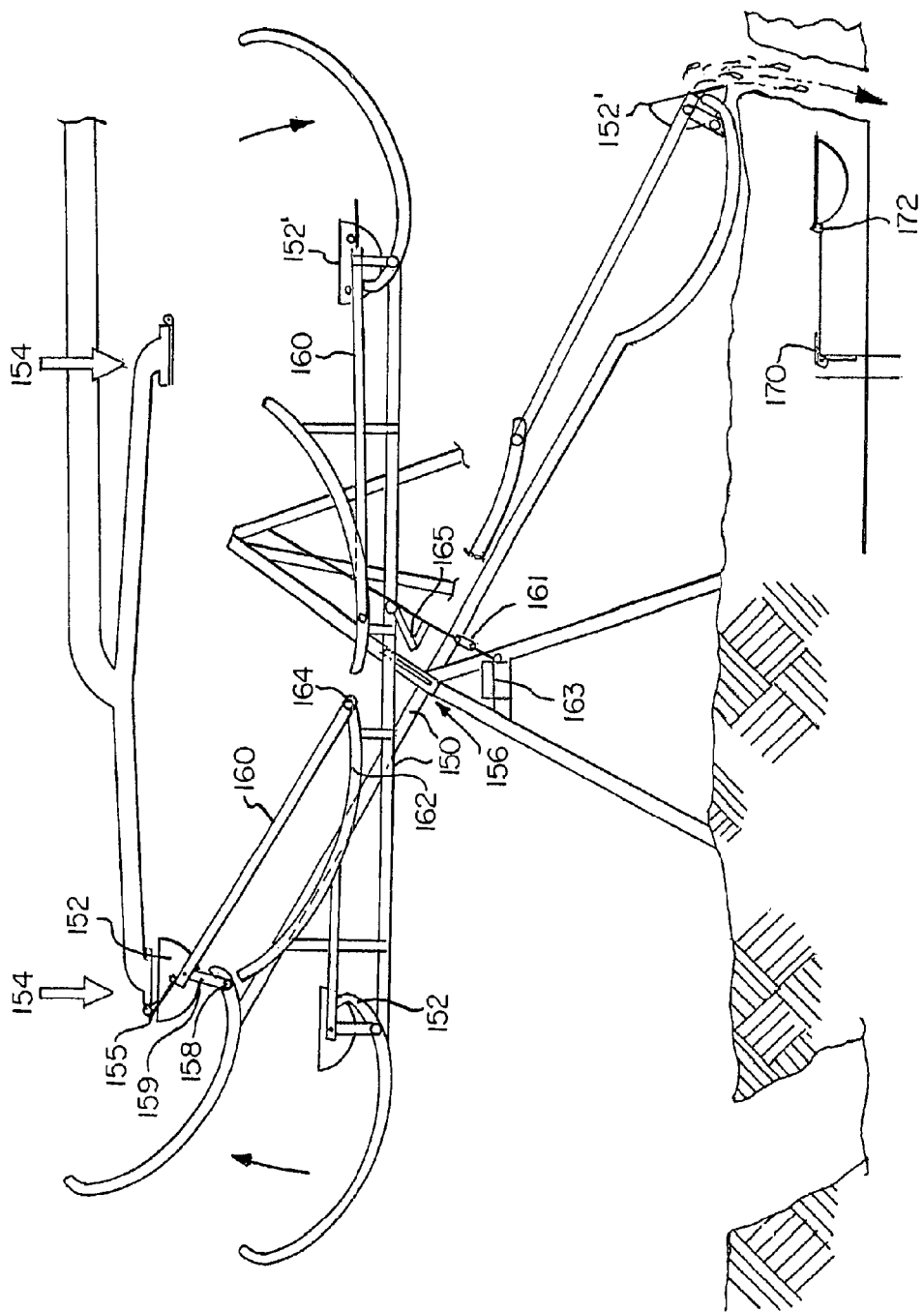
FIGS. 5A and 5B are diagrams of a teeter-totter arrangement according to the enhanced torque capabilities of FIG. 1.
Figure 5B:
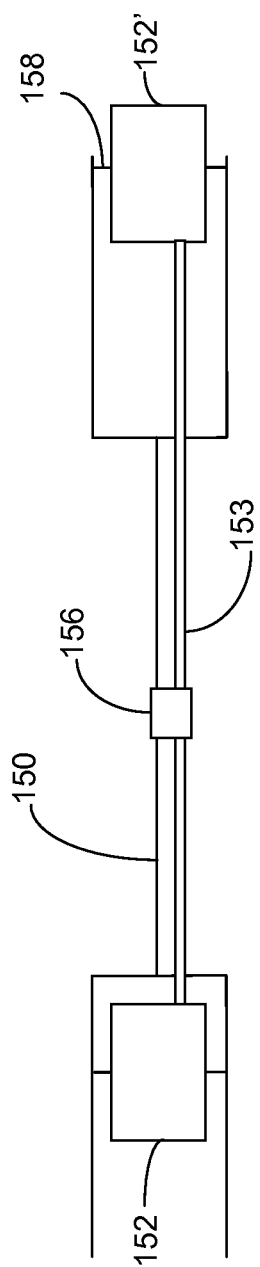

Referring now to FIGS. 5A and 5B, shown are diagrams of a teeter-totter arrangement according to the enhanced torque capabilities of FIG. 1. As shown, in this embodiment a reciprocal arm device comprises at least one support beam 150 with containers 152,152' affixed to each end. The flow of water 154 is directed into the containers 152,152' in an alternating manner (e.g., fills them when they are at or near their maximum height).

This may be achieved at least in part by a water release rod 155, although not limited thereto, which may actuate a valve or door to release water when the container 152 is ready to be filled. When a container 152' is weighted by water the support beam 150 pivots downward about a pivot point 156 (e.g., fulcrum, axis, etc.) causing its opposite container 152 to rise.

The support beam 150 may hold the containers 152,152' in a wishbone configuration (top view shown in FIG. 5B). The containers 152,152' may travel along the length of the wishbone end of the support beam 150 with rollers 158 (e.g., wheels or some other mechanism for facilitating travel). The rollers 158 may be on the end of a leg 159, as shown.

The support beam 150 may be curved on its wishbone ends, although not limited thereto. Such a curved shape facilitates an objective of the present teachings to maximize torque forces. For example, on descent (when a container 152' has water) the shape may maximize the torque as the heavy container 152' moves radially outward from the pivot point 156, increasing the upward swing on the other end. On ascent (when a container 152 is empty) the shape may minimize the downward torque by urging the container 152 radially inward toward the pivot point 156.

In one embodiment, each container 152,152' may be connected to a moving beam 160. The moving beam 160 may have at its end a roller 164 (e.g., wheels or some other mechanism for facilitating travel) that travels along a track 162 (e.g., travelling beam). The track 162 may have a curved shape to assist the container in moving outward from the pivot point 156 on descent and inward to the pivot point 156 on ascent. In one embodiment, the track 162 has substantially the same shape as the curved end of the support beam 150. The moving beam 160 and track 162 may not be necessary or desirable in all circumstances.

A resilient member 153 (shown in FIG. 5B) may facilitate the retraction of the containers 152,152' inward toward the pivot point 156 when empty. In one embodiment, the resilient member 153 may comprise one or more springs attached to the containers 152,152' such that upon the release of water, a force pulls the containers 152,152' and any associated equipment into a closer axial position relative to the pivot point 156. It should be understood that the spring may be attached to the containers 152,152' in such a way that it does not provide enough force to overcome the weight of the water such that when the containers 152,152' are filled.

As an alternative embodiment, resilient member 153 may comprise one or more connecting beams (e.g., two beams each at 180 degrees from each other) attaching the two containers 152,152' to each other so that they move in unison. This would function to eliminate the need for the springs as the weight of the water would function to pull the filled container 152 away from the pivot point 156 while at the same time would function to pull the corresponding empty container 152' inward toward the pivot point 156. When a spring is used, the spring tension can be determined based on the size of the container, the amount of water utilized, etc.

As a filled container 152' pivots downward, it will eventually reach its minimum height of pivot. At or near this point a tipping mechanism 170 (e.g. a tip rod, or the like) may cause the water to be poured from the container 152'. In one embodiment, the tipping mechanism 170 comprises a spring positioned near the container 152' in a location where the container is to be tipped. When the container 152' nears the bottom of its pivot on the support beam 150, the tipping mechanism 170 may come into contact with a member 172 (e.g., part on the container, etc.) such that the spring is activated, causing the container 152' to rotate away from the point of contact between the tipping mechanism 170 and the member 172 so the water is poured from the container. Of course, the tipping mechanism may be mounted on the ground or a member and near the container. The tipping mechanism may also be partly on the container and partly on the ground, although not limited thereto.

In one embodiment, the system may comprise multiple reciprocating support beams 150 and pairs of containers 152,152' attached in unison to the same drive train having a crank shaft 161 and gearbox 163 by way of a connecting rod 165, although not limited thereto.

The containers may generally stay upright (unless held by a tipping rod, etc.). In this respect, the containers may have curved bottoms and a point of rotation relative to the wishbone ends where they are held that is near their top. Each container (e.g., may be made of aluminum or some other appropriate material, etc.) may be of sufficient size to hold up to 35 gallons of water (e.g., approximately 250 lbs. in weight), although the size of the containers may be scalable to any dimensions (e.g., 1 gallon, 5 gallon, 10 gallon, 15 gallon, 20 gallon, 100 gallon, etc.).

A system according to the present teachings has many uses, as would be appreciated by one skilled in the art. In undeveloped countries it could be used to convert intermittent power to constant power. In more developed countries, the system could be used to reduce energy costs with peak shaving, where stored water is used when electricity is its most expensive.

Figure 6:
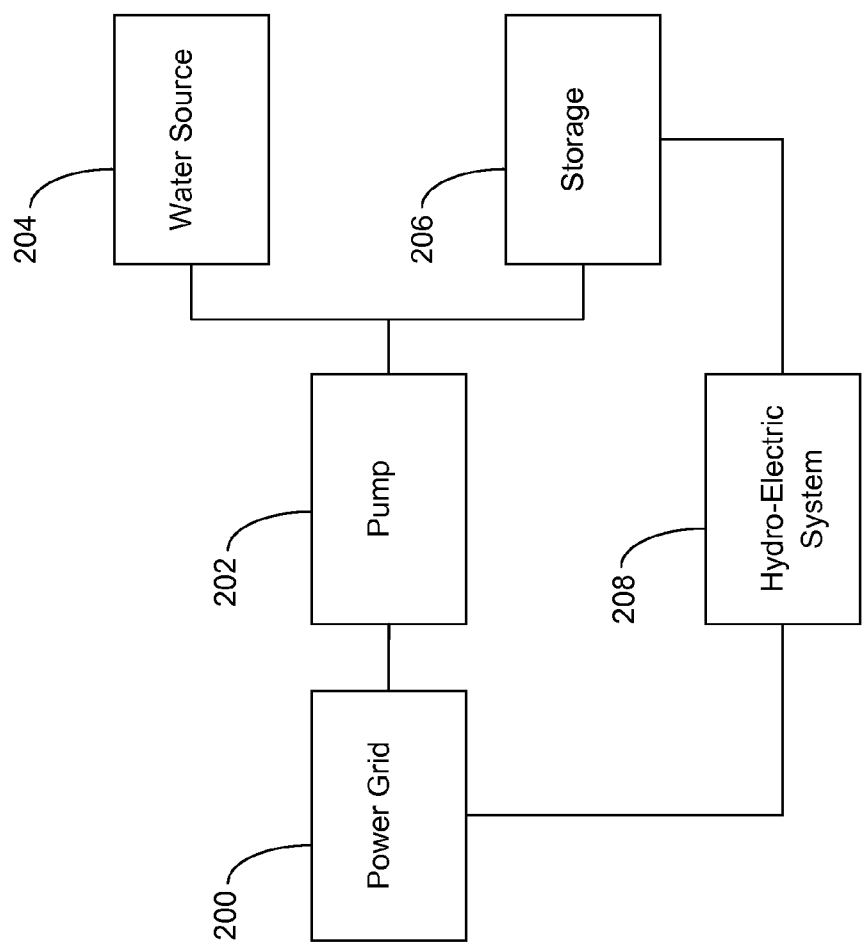
FIG. 6 is one embodiment of a power storage system using the device of FIG. 1.

Referring now to FIG. 6, shown is one embodiment of a power storage system using the device of FIG. 1. As shown, a pump 202 may be powered by an electrical power grid 200 and run when the power grid 200 is providing power to the pump in order to pump water from a water source 204 to be stored in a storage tank 206. For example, storage tank 206 may be provided at a higher elevation than hydro-electric system 208. If the power grid 200 stops providing electricity (or power otherwise becomes unavailable), the water in the storage tank 206 may be used to run the hydro-electric system 208 according to the present teachings to generate electrical power. The system could also be paired with solar and/or wind power, which may run the pump 202 during a period of time, and then utilize the water in the storage tank 206 to run the system 208 at another period of time.

Alternatively, rather than utilizing a pump 202, it will be understood that water from a water source 204 could be used to fill storage 206 if the storage is downhill from the water source. In this manner, the hydro-electric system 208 may be used to provide electric power when intermittent power is provided by the power grid 200.

In addition, it is understood that that the hydro-electric system 208 may be used to provide peak shaving. For example, the storage 206 may be filled up by the water source 204 during off-peak times. During peak power usage, the storage 206 may provide water to the hydro-electric system 208 so as to reduce the amount of electricity drawn during the peak hours and may even be used to provide excess power back to the power grid.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A hydro-electric power system for transforming mechanical power to electrical power, the system comprising:
    an electrical power generator and a mechanical device coupled to said generator, said mechanical device generating rotational power and including:
    at least two containers;
    a support beam having two ends, each end holding one of the containers and adapted to allow one of the containers to travel along a length of the support beam;
    a axis about which the support beam rotates, giving each of the containers a maximum height and a minimum height;
    a water source delivering a flow of water into each of the containers when they are located at or near their maximum height, the flow of water at least partially filling each container and causing it to descend, each container moving longitudinally outward from the axis along the length of the support beam as during a portion of the decent;
    a tipping mechanism that causes each container to release water at or near its minimum height, each container ascending after releasing water and moving longitudinally inward toward the axis along the length of the support beam as during a portion of the ascent; and
    two moving beams each having first and second ends, the first end of each moving beam connected to one of the containers and the second end of each moving beam having a roller disposed in a substantially s-shaped track to facilitate longitudinal movement of the containers along the support beam;
    said generator converting the rotational power to electrical energy.

2. The system of claim 1, wherein the ends of the support beam comprise wishbone ends.

3. The system of claim 1, wherein:
    the ends of the support beam comprise rounded supports;
    the tipping mechanism comprises a tipping rod that retains each container from rotating to an upright position as it descends so that each container will release water at or near its minimum height, after releasing water the tipping rod interacting with a member in order to release the tipping rod and allow the container to rotate to the upright position; and
    the wheel has at least four containers provided in an overlapping manner.

4. The system of claim 1, further comprising a resilient member that causes each container to move longitudinally inward toward the axis along the support beam as it ascends.

5. The system of claim 4, wherein the resilient member comprises a spring.

6. The system of claim 1, wherein each container has a point of rotation relative to the support beam to allow each container to rotate and release water, the point of rotation on an upper half of each container, and each container has a rounded bottom, such that each container generally maintains an upright position.

7. The system of claim 1, further comprising a generator connected to the axis that converts a mechanical energy of the rotation of the support beam to electricity.

8. A power storage system for storing potential energy from a water source, comprising:
    a connection to an electrical power grid;
    a storage;
    a pump powered by the electrical power grid and pumping water from the water source into the storage; and
    the system according to claim 1 utilizing the water stored in the storage to generate electrical power.

9. The system of claim 8, wherein the storage stores water during a period of time and releases the water during another time to provide peak shaving of energy usage from the electrical power grid.

10. A mechanical device for use in a hydro-electric power system, comprising:
    a wheel;
    two pairs of containers, each pair having its containers on opposite sides of the wheel;
    two intersecting support beams each having two ends, each end having a rounded support holding one of a pair of containers and adapted to allow the one of a pair of containers to travel along a length of the support beam;
    an axis about which the two support beams rotate, giving each of the containers a maximum height and a minimum height;
    a water source delivering a flow of water into each of the containers when they are located at or near their maximum height, the flow of water at least partially filling each container and causing it to descend, each container moving longitudinally outward from the axis along the support beam where each container is held during a portion of the decent;

a tipping rod that retains each container from rotating to an upright position as it descends in order to release water at or near its minimum height, after releasing water the tipping rod interacting with a member in order to release the tipping rod and allow the container to rotate to the upright position, each container ascending after releasing water and moving longitudinally inward toward the axis along the support beam where each container is held during a portion of the ascent; and at least four moving beams each having first and second ends, the first end of each moving beam connected to one of the containers and the second end of each moving beam disposed in an s-shaped track to facilitate longitudinal movement of each of the containers along the support beam where it is held.

11. The system of claim 10, wherein the rounded supports are each substantially in the shape of an oval.

12. The system of claim 10, wherein the moving beams have an angled portion and are weighted to facilitate longitudinal movement of each container along the support beam where it is held.

13. The system of claim 10, wherein the two support beams each comprise first and second beams attached on opposite sides of the wheel.

14. The system of claim 10, wherein eight containers are arranged around the wheel.

15. A mechanical device for use in a hydro-electric power system, comprising:

two containers held in a teeter totter arrangement by a support beam, the support beam having two ends, each end having a curved shape and holding one of the containers, each end adapted to allow the one of the containers to travel along a length of the support beam;

a pivot point about which the support beam pivots, giving each of the containers a maximum height and a minimum height;

a water source delivering a flow of water into each of the containers when they are located at or near their maximum height, the flow of water at least partially filling each container and causing it to descend, each container moving longitudinally outward from the pivot point along the support beam during a portion of the decent;

a tipping mechanism that tips each container to release water at or near its minimum height, each container ascending after releasing water and moving longitudinally inward toward the pivot point along the support beam during a portion of the ascent; and two moving beams each having first and second ends, the first end of each moving beam connected to one of the containers and the second end of each moving beam disposed in a track to facilitate longitudinal movement along the support beam;

wherein the tracks have substantially the same curved shape as the ends of the support beam to facilitate longitudinal movement of the containers along the support beam.

16. A drive train having at least two of the systems of claim 15.

17. The system of claim 15, wherein the ends of the support beam comprise wishbone ends.

18. A power storage system for storing potential energy from a water source, comprising:

a connection to an electrical power grid;

a storage;

a pump powered by the electrical power grid and pumping water from the water source into the storage; and the system according to claim 15 utilizing the water stored in the storage to generate electrical power.

* * * * *